United States Patent
Bhutani et al.

(10) Patent No.: US 11,947,949 B2
(45) Date of Patent: Apr. 2, 2024

(54) TECHNIQUES FOR DATA PACKAGE GENERATION

(71) Applicant: Salesforce, Inc., San Francisco, CA (US)

(72) Inventors: Sahil Bhutani, San Francisco, CA (US); William Yeh, Alameda, CA (US); Naveen Singh Jaunk, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 102 days.

(21) Appl. No.: 17/648,900

(22) Filed: Jan. 25, 2022

(65) Prior Publication Data

US 2023/0236816 A1 Jul. 27, 2023

(51) Int. Cl.
*G06F 9/445* (2018.01)
*G06F 8/65* (2018.01)
*G06F 9/455* (2018.01)
*G06F 16/21* (2019.01)
*G06F 16/23* (2019.01)
*G06F 16/25* (2019.01)

(52) U.S. Cl.
CPC ............ *G06F 8/65* (2013.01); *G06F 16/2379* (2019.01)

(58) Field of Classification Search
CPC .... G06Q 10/063; G06Q 10/101; G06F 18/23; G06F 8/64; G06F 8/60; G06F 9/44526; G06F 8/65; G06F 16/2379; G06F 16/178; G06F 16/2365; G06F 11/1448; G06F 16/214; G06F 9/5088; G06N 20/00
See application file for complete search history.

(56) References Cited

U.S. PATENT DOCUMENTS

| | | | |
|---|---|---|---|
| 9,811,527 B1 * | 11/2017 | Esposito | G06F 16/214 |
| 2006/0069605 A1 * | 3/2006 | Hatoun | G06Q 10/0633 |
| | | | 705/7.26 |
| 2021/0311711 A1 * | 10/2021 | Haryadi | G06F 8/71 |

OTHER PUBLICATIONS

Che et al., RDBMS Based Hadoop Metadata and Log Data Management Optimization, 7 pages (Year: 2019).*

* cited by examiner

*Primary Examiner* — Thuy Dao
(74) *Attorney, Agent, or Firm* — Holland & Hart

(57) ABSTRACT

A method that includes receiving a request to generate a data package for deployment in a target database environment. The request may indicate a first set of data objects from a first configuration associated with a source database environment. The method may further include determining a second set of data objects that are related to the first set of data objects based on the request and on a mapping between the first set of data objects and the second set of data objects. The method may further include transmitting an indication of the second set of data objects to a user at a user interface. The method may further include receiving a selection of one or more data objects from the second set of data objects for inclusion in the data package. The method may further include generating the data package based on the selection.

20 Claims, 12 Drawing Sheets

| ⬇ Data Kits | Edit 335 | Publish 340 ▼ |
|---|---|---|
| My CDP Kit | | |

| Data Kit Version | Created By | Created Date | Last Modified Date |
|---|---|---|---|
| 1.0.3 | John Doe | 1/9/2022 6:58 PM | 1/12/2022 12:27 PM |

Objects   Related

| | |
|---|---|
| ⋮⋮ Data Streams 305 | Add |
| ◌ Data Lakes 310 | Add |
| 🗂 Data Models 315 | Add |
| ▸ Data Actions 320 | Add |
| 📈 Calculated Insights 325 | Add |
| 🪪 Identity Resolutions 330 | Add |

TECHNIQUES FOR DATA PACKAGE GENERATION

FIELD OF TECHNOLOGY

The present disclosure relates generally to database systems and data processing, and more specifically to techniques for data package generation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud computing systems, a user may develop a configuration in a first database environment prior to deploying the configuration in a second database environment. In some cases, however, transferring the configuration from the first database environment to the second database environment may involve a large number of manual interactions, which may result in a higher number of errors and decreased user satisfaction.

BRIEF DESCRIPTION OF THE DRAWINGS

FIGS. 3 and 4 illustrate examples of user interfaces that support techniques for data package generation in accordance with aspects of the present disclosure.

DETAILED DESCRIPTION

Figure 1:
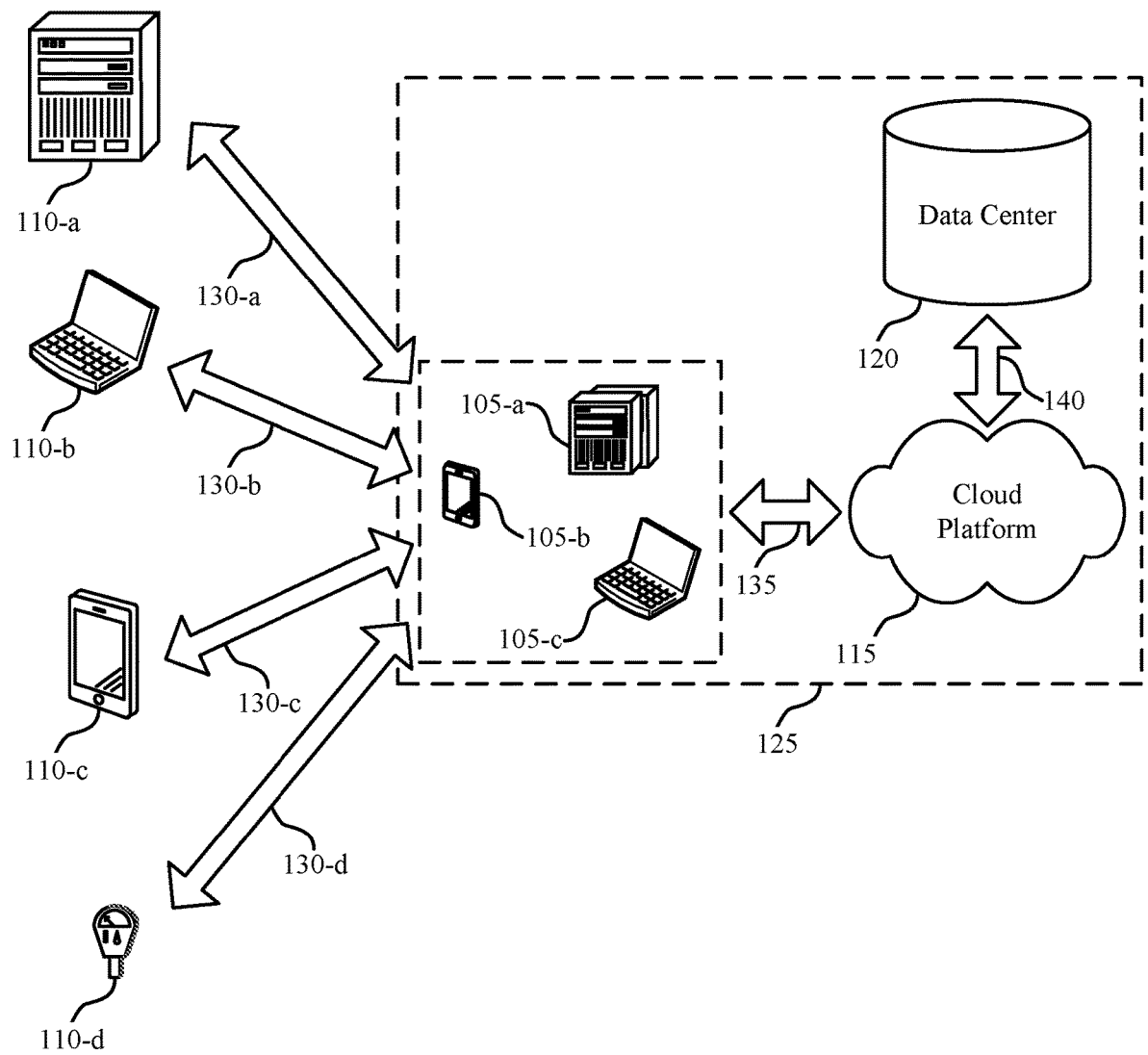
FIGS. 1 and 2 illustrate examples of data processing systems that support techniques for data package generation in accordance with aspects of the present disclosure.

In some cloud computing systems, a user may develop a configuration in a source database environment prior to deploying the configuration in a target database environment. The configuration may define various relationships between data objects such as data streams, data models, data fields, and data lakes, among other examples. To transfer the configuration from the source database environment to the target database environment, the user may generate a data package that includes metadata associated with the configuration. This metadata may be used to generate a mapping between data objects in the target database environment. In some cases, however, a data package may include large quantities of extraneous metadata (e.g., duplicate metadata), which may increase the overhead associated with the data package. In other cases, a data package may include insufficient metadata, which may cause some functionalities to fail upon deployment.

The techniques described herein may enable a user to select which metadata to include in a data package, which may provide greater flexibility and reduce the overhead associated with data package generation. As an example, a user may send a request (e.g., to a cloud platform) to generate a data package. The request may indicate a first set of data objects (e.g., data streams, data models, data lakes) from a first configuration associated with a source database environment. Upon receiving the request, the cloud platform (or an application server associated with the cloud platform) may determine a second set of data objects that are related to the first set of data objects based on a mapping between the first set of data objects and the second set of data objects.

Accordingly, the cloud platform may transmit an indication of the second set of data objects to the user (e.g., via a user interface). After transmitting the indication to the user, the cloud platform may receive (e.g., from the user) a selection of one or more data objects from the second set of data objects for inclusion in the data package. The cloud platform may use the selection from the user to generate the data package, which may include a second configuration for deployment in the target database environment. Specifically, the data package may include metadata associated with the first set of data objects (e.g., specified in the initial request) and metadata associated with the one or more data objects (e.g., from the selection).

In some examples, the cloud platform may receive (e.g., from the user) a request to deploy the data package in the target database environment. Upon receiving this request, the cloud platform may trigger deployment of the data package in the target database environment. Additionally or alternatively, the cloud platform may receive (e.g., from the user) a request to deploy an updated version of the data package in the target database environment, and may trigger deployment of the updated version of the data package in the target database based on the request. In other examples, the cloud platform may automatically trigger deployment of the data package (or an updated version of the data package) in the target database environment without any user input.

Aspects of the present disclosure may be implemented to realize one or more of the following advantages. The described techniques may improve the efficiency and overall user satisfaction associated with data package generation by enabling users to choose which metadata to include in a data package. Enabling users to flexibly manage data packages and the underlying metadata may reduce the overhead associated with data package generation, and may also reduce the likelihood of errors (e.g., functionality failures) occurring upon data package deployment.

Aspects of the disclosure are initially described in the context of an environment supporting an on-demand database service. Aspects of the disclosure are illustrated by and described with reference to data processing systems, user interfaces, and process flows. Aspects of the disclosure are further illustrated by and described with reference to apparatus diagrams, system diagrams, and flowcharts that relate to techniques for data package generation.

FIG. 1 illustrates an example of a data processing system 100 for cloud computing that supports techniques for data package generation in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120. A cloud platform 115 (also referred to herein as, but not limited to, a customer data platform (CDP)) may implement or be implemented as a server, an application, a service, or a combination thereof.

In some cloud computing systems, a cloud client 105 (e.g., a user device) may develop a configuration in a source database environment prior to deploying the configuration in a target database environment. The configuration may define various relationships between data objects such as data streams, data models, data fields, and data lakes, among other examples. To transfer the configuration from the source database environment to the target database environment, the cloud client 105 may generate a data package that includes metadata associated with the configuration. This metadata may be used to generate a mapping between data objects in the target database environment. In some cases, however, a data package may include large quantities of extraneous metadata (e.g., duplicate metadata), which may increase the overhead associated with the data package. In other cases, a data package may include insufficient metadata, which may cause some functionalities to fail upon deployment.

The techniques described herein may enable a cloud client 105 to select which metadata to include in a data package, which may provide greater flexibility and reduce the overhead associated with data package generation. As an example, a cloud client 105 may send a request (e.g., to a cloud platform 115) to generate a data package. The request may indicate a first set of data objects (e.g., data streams, data models, data lakes) from a first configuration associated with a source database environment. Upon receiving the request, the cloud platform 115 (or an application server associated with the cloud platform 115) may determine a second set of data objects that are related to the first set of data objects based on a mapping between the first set of data objects and the second set of data objects.

Accordingly, the cloud platform 115 may transmit an indication of the second set of data objects to the cloud client 105 (e.g., via a user interface). After transmitting the indication to the cloud client 105, the cloud platform 115 may receive (e.g., from the cloud client 105) a selection of one or more data objects from the second set of data objects for inclusion in the data package. The cloud platform 115 may use the selection from the cloud client 105 to generate the data package, which may include a second configuration for deployment in the target database environment. Specifically, the data package may include metadata associated with the first set of data objects (e.g., specified in the initial request) and metadata associated with the one or more data objects (e.g., from the selection).

In some examples, the cloud platform 115 may receive (e.g., from the cloud client 105) a request to deploy the data package in the target database environment. Upon receiving this request, the cloud platform 115 may trigger deployment of the data package in the target database environment. Additionally or alternatively, the cloud platform 115 may receive (e.g., from the cloud client 105) a request to deploy an updated version of the data package in the target database environment, and may trigger deployment of the updated version of the data package in the target database based on the request. In other examples, the cloud platform 115 may automatically trigger deployment of the data package (or an updated version of the data package) in the target database environment without any user input.

Aspects of the present disclosure may be implemented to realize one or more of the following advantages. The described techniques may improve the efficiency and overall user satisfaction associated with data package generation by enabling cloud clients 105 to choose which metadata to include in a data package. Enabling cloud clients 105 to flexibly manage data packages and the underlying metadata may reduce the overhead associated with data package generation, and may also reduce the likelihood of errors (e.g., functionality failures) occurring upon data package deployment.

It should be appreciated by a person skilled in the art that one or more aspects of the disclosure may be implemented in a data processing system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
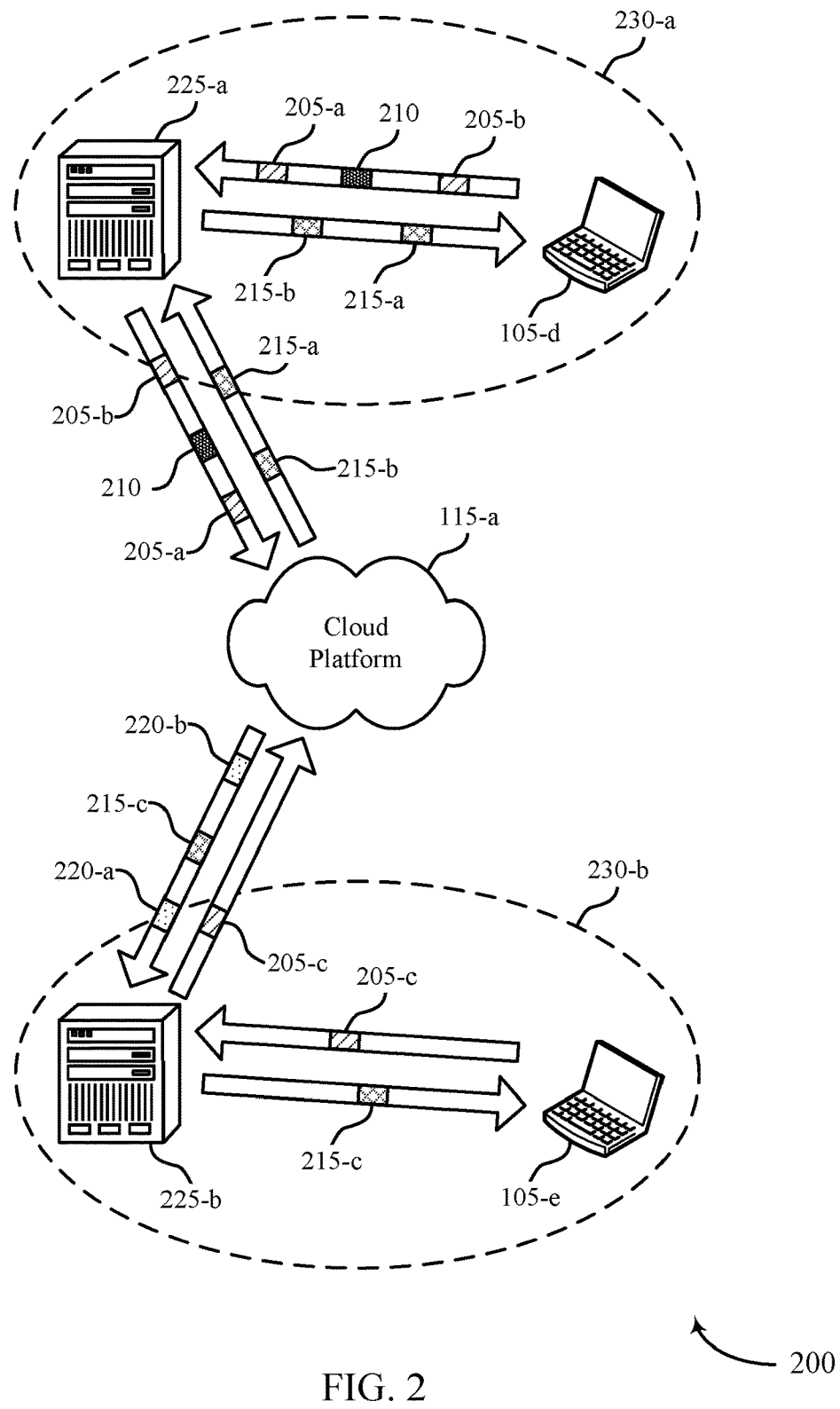

FIG. 2 illustrates an example of a data processing system 200 that supports techniques for data package generation in accordance with aspects of the present disclosure. The data processing system 200 may implement or be implemented by aspects of the data processing system 100. For example, the data processing system 100 may include a cloud client 105-d, a cloud client 105-e, and a cloud platform 115-a, which may be examples of corresponding devices described with reference to FIG. 1. In the data processing system 200, the cloud clients 105 may use data packages 220 to transfer a configuration from a source database environment 230-a to a target database environment 230-b.

Some cloud clients 105 may use data packages 220 to migrate and deploy configurations between different database environments (e.g., organizations). In some cloud computing systems, a data package generated by a user may automatically include either all related metadata or no related metadata. This approach may ensure that platform referential integrity is maintained throughout the migration process, but may not be suitable for applications with exponentially complex data models. For such applications, it may be desirable to provide customers and cloud service providers with the capability to flexibly manage which metadata to include in a data package and the capability to maintain all underlying relationships and references. Adding all related metadata to a data package may result in large amounts of duplicate metadata, which may increase the overhead associated with the data package. In contrast, including no metadata in a data package may cause certain functionalities to fail due to a lack of related metadata.

Aspects of the present disclosure may enable cloud clients 105 to flexibly add metadata (e.g., data streams, data models) to a data package before generating the data package. The techniques described herein may provide a new experience layer that presents related metadata to end users (e.g., cloud clients 105) and enables these end users to add metadata to the data package. Once the end user has selected which metadata to include in the data package, this metadata (and related content) may be included in the data package, which may reduce the likelihood of the data package missing metadata or including extraneous (e.g., duplicate) metadata. The techniques described herein provide a framework to identify and suggest (e.g., to an end user) metadata that may or may not be related. For example, aspects of the present disclosure may support techniques for automatically suggesting related metadata that is not directly related (e.g., based on existing platform relationships) but that is available to the cloud platform 115-a. By enabling end users to select and group metadata, the techniques described herein may provide end users with more control over the data package generation process.

In the example of FIG. 2, the cloud client 105-d may transmit (e.g., via a user interface) a request 205-a to generate a data package 220-a for deployment in the target database environment 230-b. The cloud client 105-d may transmit the request 205-a to an application server 225-a within the source database environment 230-a, and the application server 225-a may relay the request 205-a to the cloud platform 115-a. The request 205-a may indicate a first set of data objects from a first configuration associated with the source database environment 230-a. Upon receiving the request 205-a (e.g., from the cloud client 105-d via the application server 225-a), the cloud platform 115-a may determine a second set of data objects from the first configuration that are related to the first set of data objects based on the request 205-a and a mapping between the first set of data objects and the second set of data objects.

After determining the second set of data objects, the cloud platform 115-a may transmit an indication 215-a of the second set of data objects to the cloud client 105-d via the application server 225-a. Upon receiving the indication 215-a, the cloud client 105-d may indicate (e.g., to the cloud platform 115-a via the application server 225-a) a selection 210 of one or more data objects from the second set of data objects for inclusion in the data package 220-a. The cloud platform 115-a may generate the data package 220-a based on the selection 210 of the cloud client 105-d. The data package 220-a may include a second configuration for deployment in the target database environment 230-b. The second configuration may include metadata associated with the first set of data objects and metadata associated with the one or more data objects indicated by the selection 210.

In some examples, the cloud platform 115-a may receive (e.g., from the cloud client 105-d via the application server 225-a) a request 205-b to deploy the data package 220-a in the target database environment 230-b. Upon receiving the request 205-b, the cloud platform 115-a may trigger deployment of the data package 220-a at an application server 225-b in the target database environment 230-b. Accordingly, the application server 225-b may generate the first set of data objects (e.g., indicated by the request 205-a) and the one or more data objects (e.g., indicated by the selection 210) in the target database environment 230-b. For example, the application server 225-b may generate one or more data streams, data lakes, data models, data actions, or calculated insights based on the data package 220-*a* and a set of data records stored in the target database environment 230-*b*.

In some examples, a data package 220-*b* (e.g., an updated version of the data package 220-*a*) may become available for deployment in the target database environment 230-*b*. In such examples, the cloud platform 115-*a* may transmit (e.g., to the cloud client 105-*d* via the application server 225-*a*) an indication 215-*b* that the data package 220-*b* is available for deployment. Upon receiving the indication 215-*b*, the cloud client 105-*d* may transmit a request to deploy the data package 220-*b* in the target database environment 230-*b*. Accordingly, the cloud platform 115-*a* may trigger deployment of the data package 220-*b* at the application server 225-*b* within the target database environment 230-*b*. Additionally or alternatively, the cloud platform 115-*a* may transmit an indication 215-*c* (e.g., to a cloud client 105-*e* via the application server 225-*b*) that the data package 220-*b* is available for deployment in the target database environment 230-*b*. Upon receiving the indication 215-*c*, the cloud client 105-*e* may transmit (e.g., to the cloud platform 115-*a* via the application server 225-*b*) a request 205-*c* to deploy the data package 220-*b* at the application server 225-*b*. In other examples, the cloud platform 115-*a* may automatically trigger deployment of the data packages 220 at the application server 225-*b* (e.g., without any user input). The cloud platform 115-*a* may determine whether to prompt the cloud clients 105 or automatically deploy the data packages 220 based on the metadata included in the data packages 220.

The techniques and operations described with reference to FIG. 2 may enable the cloud client 105-*d* to generate data packages 220 with greater flexibility and reduced overhead (e.g., less extraneous metadata) by providing the cloud client 105-*d* with means to select which metadata to include in the data packages 220. Providing the cloud client 105-*d* with this functionality may enable the cloud client 105-*d* to transfer a configuration from the source database environment 230-*a* to the target database environment 230-*b* with greater efficiency (less manual interaction) and fewer deployment errors (e.g., functionality failures), which may result in higher overall user satisfaction.

FIG. 3 illustrates an example of a user interface 300 that supports techniques for data package generation in accordance with aspects of the present disclosure. The user interface 300 may implement or be implemented by aspects of the data processing system 100 or the data processing system 200. For example, the user interface 300 may be implemented by a cloud client 105 or a cloud platform 115, which may be examples of corresponding devices described with reference to FIG. 1. The user interface 300 may enable a user (e.g., a cloud client 105) to customize the metadata included in a data package, which may provide greater flexibility, reduced overhead, and fewer deployment errors, among other benefits.

Aspects of the present disclosure may support improved data package generation at a CDP, which may be an example of a server, application, service, or the like. As described herein, a CDP may support data ingestion and modeling, query and insight generation, segmentation, activation, automated data consolidation from various sources, identity resolution rule generation for de-duplication and merging, insight and segment generation from data models, and automated data activation at various data sources, among other examples. In accordance with the described techniques, a CDP user may use a data kit to select metadata for inclusion in a data package. Data kits may enable CDP users to generate reusable data stream metadata, package customized data models, extend information models, extract segments and insights from data models, package match and merge rules, and generate activation metadata for various platforms at a user interface.

In the example of FIG. 3, a user (e.g., cloud client) may select various data objects for inclusion in a data package. For example, the user may select one or more data streams 305, data lakes 310, data models 315, data actions 320, calculated insights 325, or identity resolutions 330 for inclusion in a data package. As described herein, a data lake may refer to a system or repository of raw data from various data streams (e.g., source systems or repositories from which raw data flows into the data lake). A data model may refer to the logical structure of a database environment (e.g., relationships between data objects in the database environment). A calculated insight may refer to a trend or pattern identified from data in a data model. An identity resolution may refer to the procedure of aggregating and combining data records associated with the same user.

The user interface 300 may enable a user to generate a data kit for a data package. The data kit may define which data objects and related metadata to include in the data package. As illustrated in the example of FIG. 3, the data kit may be associated with a name (e.g., My CDP Kit), a version (e.g., 1.0.3), a creator (e.g., John Doe), a creation date (e.g., Jan. 9, 2022 at 6:58 PM), and a last modified date (e.g., Jan. 12, 2022 at 12:27 PM). The user interface 300 may include an edit option 335, which may enable the user to modify the data kit. The user interface 300 may also include a publish option 340, which may enable the user to publish the data kit to a cloud platform (e.g., the cloud platform 115-*a* described with reference to FIG. 2).

The data kit illustrated in the example of FIG. 3 may define a set of rules for performing a segmentation procedure on data records stored in a target database environment, a set of rules for performing a match and merge procedure on data records stored in the target database environment, or both. The data kit may also include a calculated insight definition, which may be associated with a name field, an activation status field, a last run time field, a last run status field, a user identifier, a creation date field, a last modified date field, or a combination thereof. Additionally or alternatively, the data kit may include a data stream definition, which may be associated with a name field, a connector type field, an activation status field, a last run status field, a last process records field, a total records field, a last refreshed field, or a combination thereof.

The techniques and operations described with reference to FIG. 3 may enable a user (e.g., a cloud client) to generate a data package with greater flexibility and reduced overhead (e.g., less extraneous metadata) by providing the user with means to select which metadata is included in the data package. Providing users with this functionality may enable the users to transfer a configuration from a source database environment to a target database environment with greater efficiency (less manual interaction) and fewer deployment errors (e.g., functionality failures), which may result in higher overall user satisfaction.

Figure 4:
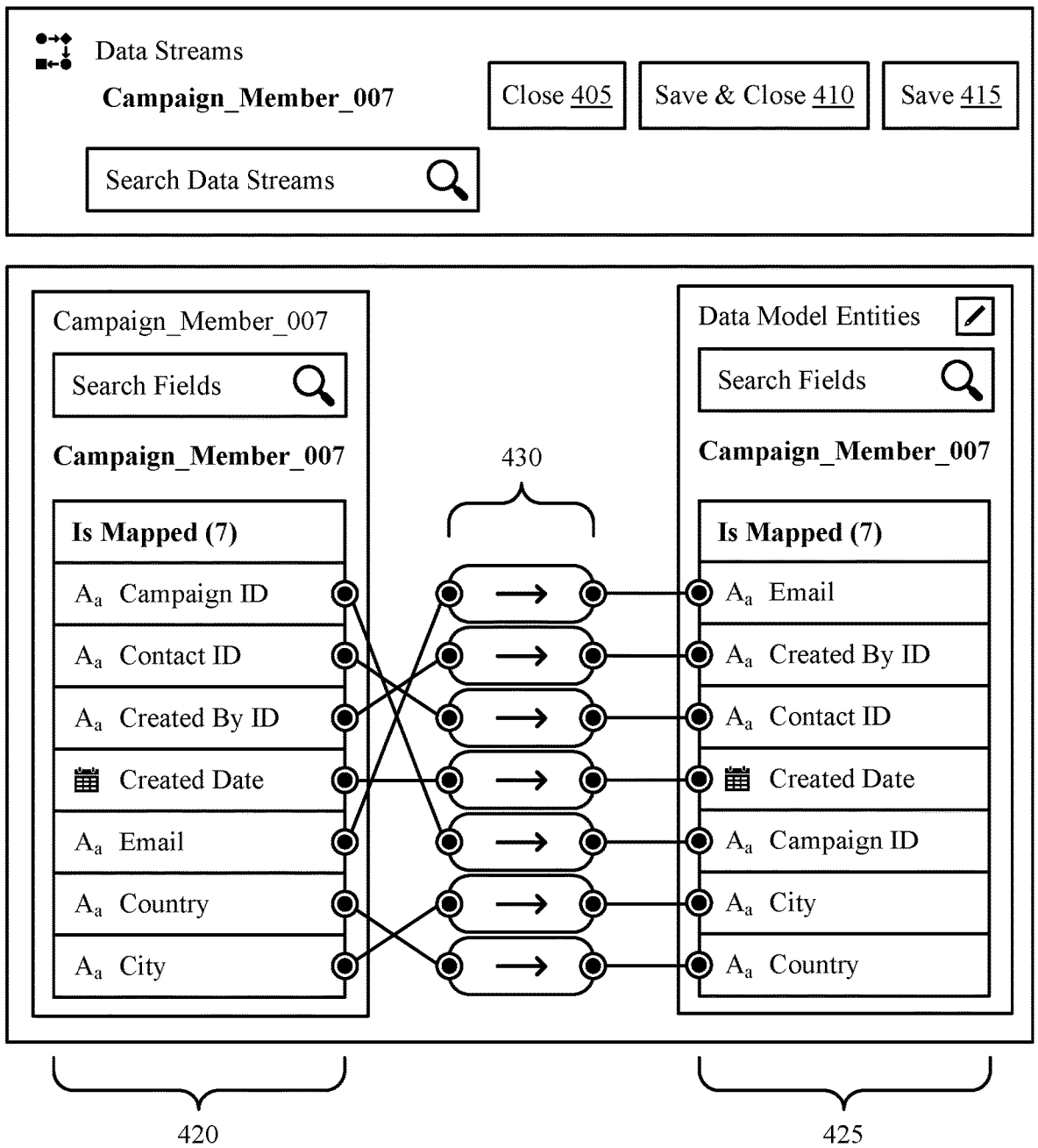

FIG. 4 illustrates an example of a user interface 400 that supports techniques for data package generation in accordance with aspects of the present disclosure. The user interface 400 may implement or be implemented by aspects of the data processing system 100 or the data processing system 200. For example, the user interface 400 may be implemented by a cloud client 105 or a cloud platform 115, which may be examples of corresponding devices described with reference to FIG. 1. The user interface 400 may enable a user to generate a mapping between data objects (e.g., data streams, data models) in a deployment configuration using metadata associated with the data objects.

In the example of FIG. 4, a cloud platform may generate a mapping between data fields 420 of a data stream (e.g., Campaign_Member_007) and data fields 425 from related data model entities. The data fields 420 of the data stream may include a Campaign ID field, a Contact ID field, a Created By ID field, a Created Date field, an Email field, a Country field, and a City field. Similarly, the data fields 425 of the related data model entities may include an Email field, a Created By ID field, a Contact ID field, a Created Date field, a Campaign ID field, a City field, and a Country field. To generate the mapping between the data fields 420 of the data stream and the data fields 425 of the related data model entities, the cloud platform may generate connections 430 between the data fields 420 and the data fields 425.

In some examples, the cloud platform may automatically generate the mapping between the data fields 420 of the data stream and the data fields 425 of the related data model entities. In other examples, a user may manually create or update the mapping between the data fields 420 of the data stream and the data fields 425 of the related data model entities. The user interface 400 may include a close option 405, a save and close option 410, and a save option 415, which may enable the user to save and update the mapping after adjusting or modifying the connections 430 between the data fields 420 of the data stream and the data fields 425 of the related data model entities.

The user interface 400 may also support queries related to the data stream, the related data model entities, the data fields 420 of the data stream, the data fields 425 of the related data model entities, or a combination thereof. For example, the user interface 400 may enable a user to search for data streams that are stored at a cloud platform. Likewise, the user interface 400 may enable a user to search for a specific field within the data fields 420 of the data stream or a specific field within the data fields 425 of the related data model entities.

The techniques and operations described with reference to FIG. 4 may enable a user (e.g., a cloud client) to generate a data package with greater flexibility and reduced overhead (e.g., less extraneous metadata) by providing the user with means to select which metadata is included in the data package. Providing users with this functionality may enable users to transfer a configuration from a source database environment to a target database environment with greater efficiency (less manual interaction) and fewer deployment errors (e.g., functionality failures), which may result in higher overall user satisfaction.

Figure 5:
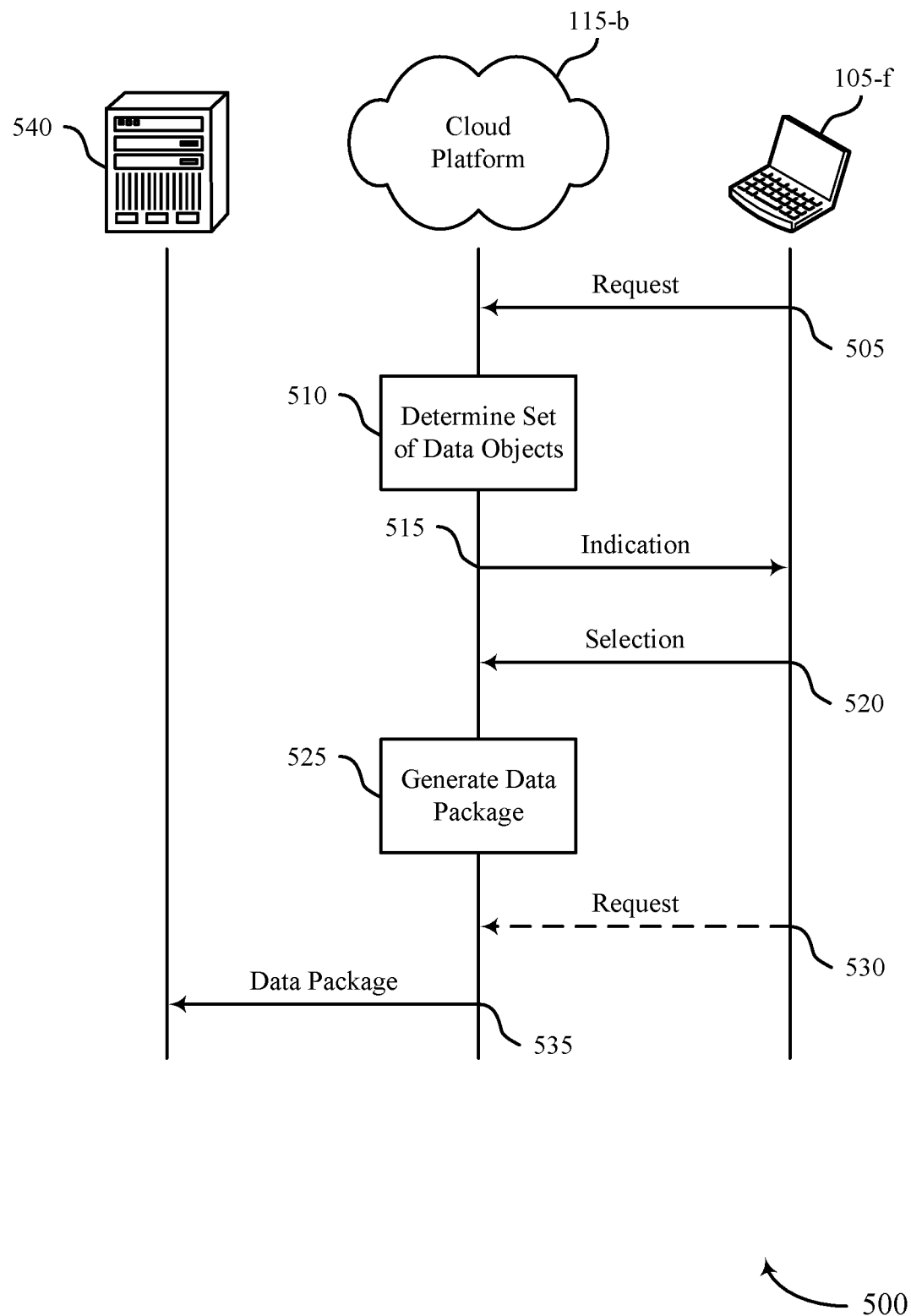
FIG. 5 illustrates an example of a process flow that supports techniques for data package generation in accordance with aspects of the present disclosure.

FIG. 5 illustrates an example of a process flow 500 that supports techniques for data package generation in accordance with aspects of the present disclosure. The process flow 500 may implement or be implemented by aspects of the data processing system 100 or the data processing system 200. For example, the process flow 500 may include a cloud client 105-f and a cloud platform 115-b, which may be examples of corresponding devices described with reference to FIGS. 1 and 2. The process flow 500 may also include an application server 540, which may be an example of an application server 225 described with reference to FIG. 2. In the following description of the process flow 500, operations between the cloud client 105-f, the cloud platform 115-b, and the application server 540 may be performed in a different order or at a different time than as shown. Additionally or alternatively, some operations may be omitted from the process flow 500, and other operations may be added to the process flow 500.

At 505, the cloud client 105-f may transmit (e.g., to the cloud platform 115-b and via a user interface) a request to generate a data package for deployment in a target database environment. The request may indicate a first set of data objects from a first configuration associated with a source database environment that is different from the target database environment. In some examples, the cloud client 105-f may be associated with a tenant of a multi-tenant system, the source database environment may correspond to a test database environment of the tenant, and the target database environment may correspond to a production database environment of the tenant. In some examples, the cloud client 105-f may modify the first configuration (e.g., in the source database environment) prior to generating the data package.

At 510, the cloud platform 115-b may determine a second set of data objects from the first configuration that are related to the first set of data objects based on the request from the cloud client 105-f and a mapping between the first set of data objects and the second set of data objects in the source database environment. In some examples, the cloud platform 115-b may generate the mapping between one or more data fields associated with the first set of data objects and one or more data fields associated with the second set of data objects (as described with reference to FIG. 4). As an example, the first set of data objects may include one or more data streams, and the second set of data objects may include data lakes, data models, or data actions related to the one or more data streams.

At 515, the cloud platform 115-b may transmit an indication of the second set of data objects to the cloud client 105-f via a user interface. At 520, the cloud client 105-f may select (e.g., via a user interface) one or more data objects from the second set of data objects for inclusion in the data package. For example, the cloud client 105-f may select a calculated insight definition for inclusion in the data package. The calculated insight definition may include a name field, an activation status field, a last run time field, a last run status field, a user identifier associated with the calculated insight definition, a creation date field, a last modified date field, or a combination thereof. Additionally or alternatively, the cloud client 105-f may select a data stream definition for inclusion in the data package. The data stream definition may include a name field, a connector type field, an activation status field, a last run status field, a last process records field, a total records field, a last refreshed field, or a combination thereof.

At 525, the cloud platform 115-b may generate the data package based on the selection from the cloud client 105-f. The data package may include a second configuration for deployment in the target database environment (e.g., at the application server 540). The second configuration may include metadata associated with the first set of data objects (e.g., from the initial request) and metadata associated with the one or more data objects (e.g., from the selection). More specifically, the second configuration may include metadata associated with one or more data streams, one or more data models, one or more data lakes, or a combination thereof. The second configuration may also include activation metadata associated with the target database environment. In some examples, the second configuration may also include a set of rules for performing a segmentation procedure on data records stored in the target database environment, a set of rules for performing a match and merge procedure on data records stored in the target database environment, or both.

In some examples, the cloud client 105-f may transmit a request to trigger deployment of the data package in the target database environment at 530. At 535, the cloud platform 115-*b* may trigger deployment of the data package at the application server 540 (e.g., the target database environment). Upon triggering deployment of the data package, the application server 540 may generate the first set of data objects and the one or more data objects from the second set of data objects (e.g., using data from the target database environment). For example, the application server 540 may generate one or more calculated insight metrics for display in the target database environment based on a calculated insight definition from the data package and various data records stored in the target database environment. Likewise, the application server 540 may generate a data stream in the target database environment based on a data stream definition from the data package and various data records stored in the target database environment. In some examples, the cloud platform 115-*b* may trigger deployment of the data package at the application server 540 based on receiving a request from the cloud client 105-*f* (e.g., at 530). In other examples, the cloud platform 115-*b* may automatically trigger deployment of the data package at the application server 540 (e.g., without user input).

In some examples, the cloud platform 115-*b* (or the application server 540) may update the second configuration in the target database environment. In other words, an updated version of the data package may become available for deployment in the target database environment. In such examples, the cloud platform 115-*b* may transmit (e.g., to the cloud client 105-*f* and via a user interface) an indication that an updated version of the data package is available for deployment in the target database environment. Upon transmitting this indication, the cloud platform 115-*b* may receive (e.g., from the cloud client 105-*f* and via a user interface) a request to deploy the updated version of the data package. Accordingly, the cloud platform 115-*b* may trigger deployment of the updated version of the data package at the application server 540. Alternatively, the cloud platform 115-*b* may automatically trigger deployment of the updated version of the data package at the application server 540 (e.g., without user input). The cloud platform 115-*b* may determine whether to prompt the cloud client 105-*f* or automatically trigger deployment of the updated version of the data package based on the metadata included in the data package.

The techniques and operations described in the process flow 500 may enable the cloud client 105-*f* to generate a data package with greater flexibility and reduced overhead (e.g., less extraneous metadata) by providing the cloud client 105-*f* with means to select which metadata is included in the data package. Providing the cloud client 105-*f* with this functionality may enable the cloud client 105-*f* to transfer a configuration from a source database environment to a target database environment with greater efficiency (less manual interaction) and fewer deployment errors (e.g., functionality failures), which may result in higher overall user satisfaction.

Figure 6:
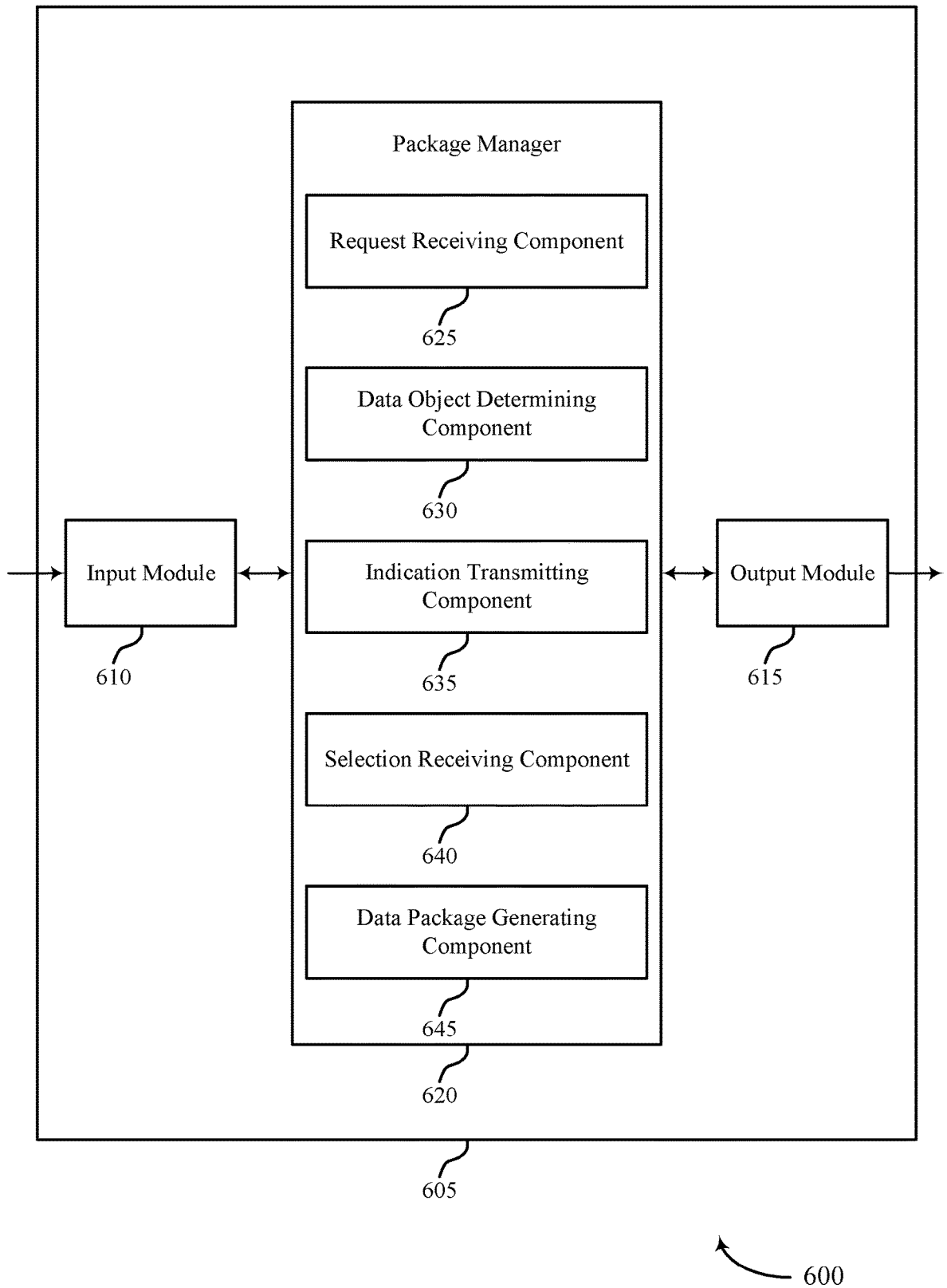
FIG. 6 shows a block diagram of an apparatus that supports techniques for data package generation in accordance with aspects of the present disclosure.

FIG. 6 shows a block diagram 600 of a device 605 that supports techniques for data package generation in accordance with aspects of the present disclosure. The device 605 may include an input module 610, an output module 615, and a package manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the package manager 620 to support techniques for data package generation. In some cases, the input module 610 may be a component of an input/output (I/O) controller 810 as described with reference to FIG. 8.

The output module 615 may manage output signals for the device 605. For example, the output module 615 may receive signals from other components of the device 605, such as the package manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the package manager 620 may include a request receiving component 625, a data object determining component 630, an indication transmitting component 635, a selection receiving component 640, a data package generating component 645, or any combination thereof. In some examples, the package manager 620, or various components thereof, may be configured to perform various operations (e.g., receiving, monitoring, transmitting) using or otherwise in cooperation with the input module 610, the output module 615, or both. For example, the package manager 620 may receive information from the input module 610, send information to the output module 615, or be integrated in combination with the input module 610, the output module 615, or both to receive information, transmit information, or perform various other operations as described herein.

The package manager 620 may support generating a data package for deployment in a target database environment in accordance with examples as disclosed herein. The request receiving component 625 may be configured as or otherwise support a means for receiving, from a user at a user interface, a request to generate the data package, the request indicating a first set of data objects from a first configuration associated with a source database environment. The data object determining component 630 may be configured as or otherwise support a means for determining a second set of data objects from the first configuration that are related to the first set of data objects based on the request and on a mapping between the first set of data objects and the second set of data objects in the source database environment. The indication transmitting component 635 may be configured as or otherwise support a means for transmitting an indication of the second set of data objects to the user at the user interface based on the determining. The selection receiving component 640 may be configured as or otherwise support a means for receiving, from the user at the user interface, a selection of one or more data objects from the second set of data objects for inclusion in the data package. The data package generating component 645 may be configured as or otherwise support a means for generating the data package based on the selection, the data package including a second configuration for deployment in the target database environment, the second configuration including metadata associated with the first set of data objects and metadata associated with the one or more data objects from the selection.

Figure 7:
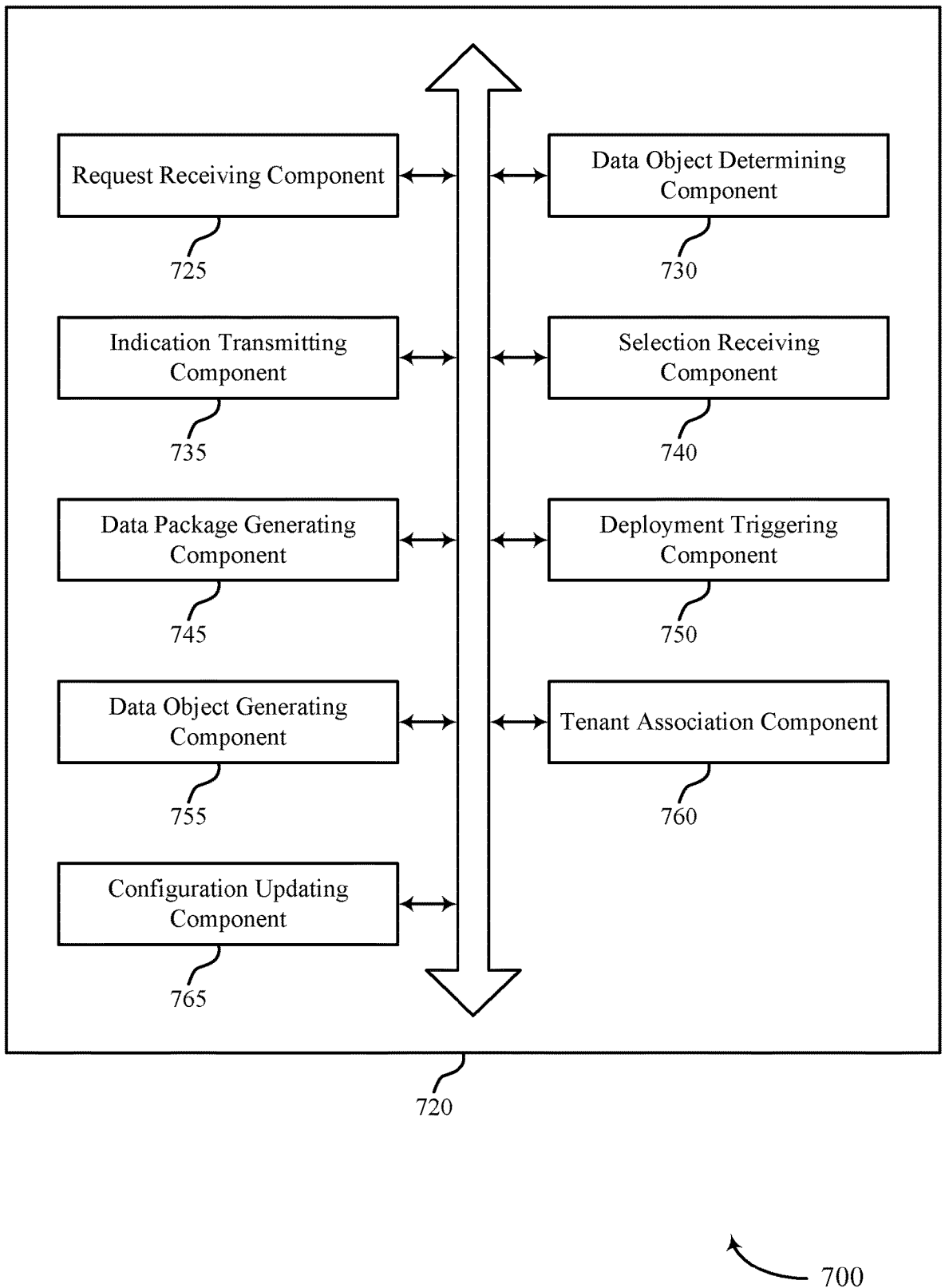
FIG. 7 shows a block diagram of a package manager that supports techniques for data package generation in accordance with aspects of the present disclosure.

FIG. 7 shows a block diagram 700 of a package manager 720 that supports techniques for data package generation in accordance with aspects of the present disclosure. The package manager 720 may be an example of aspects of a package manager or a package manager 620, or both, as described herein. The package manager 720, or various components thereof, may be an example of means for performing various aspects of techniques for data package generation as described herein. For example, the package manager 720 may include a request receiving component 725, a data object determining component 730, an indication transmitting component 735, a selection receiving component 740, a data package generating component 745, a deployment triggering component 750, a data object generating component 755, a tenant association component 760, a configuration updating component 765, or any combination thereof. Each of these components may communicate, directly or indirectly, with one another (e.g., via one or more buses).

The package manager 720 may support generating a data package for deployment in a target database environment in accordance with examples as disclosed herein. The request receiving component 725 may be configured as or otherwise support a means for receiving, from a user at a user interface, a request to generate the data package, the request indicating a first set of data objects from a first configuration associated with a source database environment. The data object determining component 730 may be configured as or otherwise support a means for determining a second set of data objects from the first configuration that are related to the first set of data objects based on the request and on a mapping between the first set of data objects and the second set of data objects in the source database environment. The indication transmitting component 735 may be configured as or otherwise support a means for transmitting an indication of the second set of data objects to the user at the user interface based on the determining. The selection receiving component 740 may be configured as or otherwise support a means for receiving, from the user at the user interface, a selection of one or more data objects from the second set of data objects for inclusion in the data package. The data package generating component 745 may be configured as or otherwise support a means for generating the data package based on the selection, the data package including a second configuration for deployment in the target database environment, the second configuration including metadata associated with the first set of data objects and metadata associated with the one or more data objects from the selection.

In some examples, the request receiving component 725 may be configured as or otherwise support a means for receiving, from the user at the user interface, a request to deploy the data package in the target database environment. In some examples, the deployment triggering component 750 may be configured as or otherwise support a means for triggering deployment of the data package in the target database environment based on the request.

In some examples, the data object generating component 755 may be configured as or otherwise support a means for generating the first set of data objects and the one or more data objects from the selection in the target database environment based on triggering deployment of the data package.

In some examples, the data object generating component 755 may be configured as or otherwise support a means for generating the mapping between one or more data fields associated with the first set of data objects and one or more data fields associated with the second set of data objects.

In some examples, the user may be associated with a tenant of a multi-tenant system. In some examples, the source database environment may correspond to a test database environment of the tenant. In some examples, the target database environment may correspond to a production database environment of the tenant.

In some examples, the request receiving component 725 may be configured as or otherwise support a means for receiving, from the user at the user interface, a request to modify the first configuration in the source database environment prior to generation of the data package.

In some examples, the second configuration includes metadata associated with one or more data streams, metadata associated with one or more data models related to the one or more data streams, activation metadata associated with the target database environment, or a combination thereof.

In some examples, the first set of data objects includes one or more data streams. In some examples, the second set of data objects includes one or more data lakes associated with the one or more data streams, one or more data models associated with the one or more data streams, one or more data actions associated with the one or more data streams, or a combination thereof.

In some examples, the second configuration includes a set of rules for performing a segmentation procedure on multiple data records stored in the target database environment, a set of rules for performing a match and merge procedure on the multiple data records stored in the target database environment, or both.

In some examples, to support receiving the selection from the user, the selection receiving component 740 may be configured as or otherwise support a means for receiving, from the user at the user interface, a selection of a calculated insight definition for inclusion in the data package, the calculated insight definition including a name field, an activation status field, a last run time field, a last run status field, a user identifier associated with the calculated insight definition, a creation date field, a last modified date field, or a combination thereof.

In some examples, the data object generating component 755 may be configured as or otherwise support a means for generating multiple calculated insight metrics for display in the target database environment based on the calculated insight definition and on multiple data records stored in the target database environment.

In some examples, to support receiving the selection from the user, the selection receiving component 740 may be configured as or otherwise support a means for receiving, from the user at the user interface, a selection of a data stream definition for inclusion in the data package, the data stream definition including a name field, a connector type field, an activation status field, a last run status field, a last process records field, a total records field, a last refreshed field, or a combination thereof.

In some examples, the data object generating component 755 may be configured as or otherwise support a means for generating a data stream in the target database environment based on the data stream definition and on multiple data records stored in the target database environment.

In some examples, to support receiving the selection from the user, the selection receiving component 740 may be configured as or otherwise support a means for receiving, from the user at the user interface, a selection of one or more match and merge rules for inclusion in the data package, the one or more match and merge rules defining criteria for combining multiple data records stored in the target database environment.

In some examples, the configuration updating component 765 may be configured as or otherwise support a means for updating the second configuration in the target database environment. In some examples, the indication transmitting component 735 may be configured as or otherwise support a means for transmitting, to the user at the user interface, an indication that an updated version of the data package is available for deployment in the target database environment.

In some examples, the request receiving component 725 may be configured as or otherwise support a means for receiving, from the user at the user interface, a request to deploy the updated version of the data package. In some examples, the deployment triggering component 750 may be configured as or otherwise support a means for triggering deployment of the updated version of the data package in the target database environment based on the request.

In some examples, the deployment triggering component 750 may be configured as or otherwise support a means for automatically triggering deployment of an updated version of the data package in the target database environment based on the second configuration.

Figure 8:
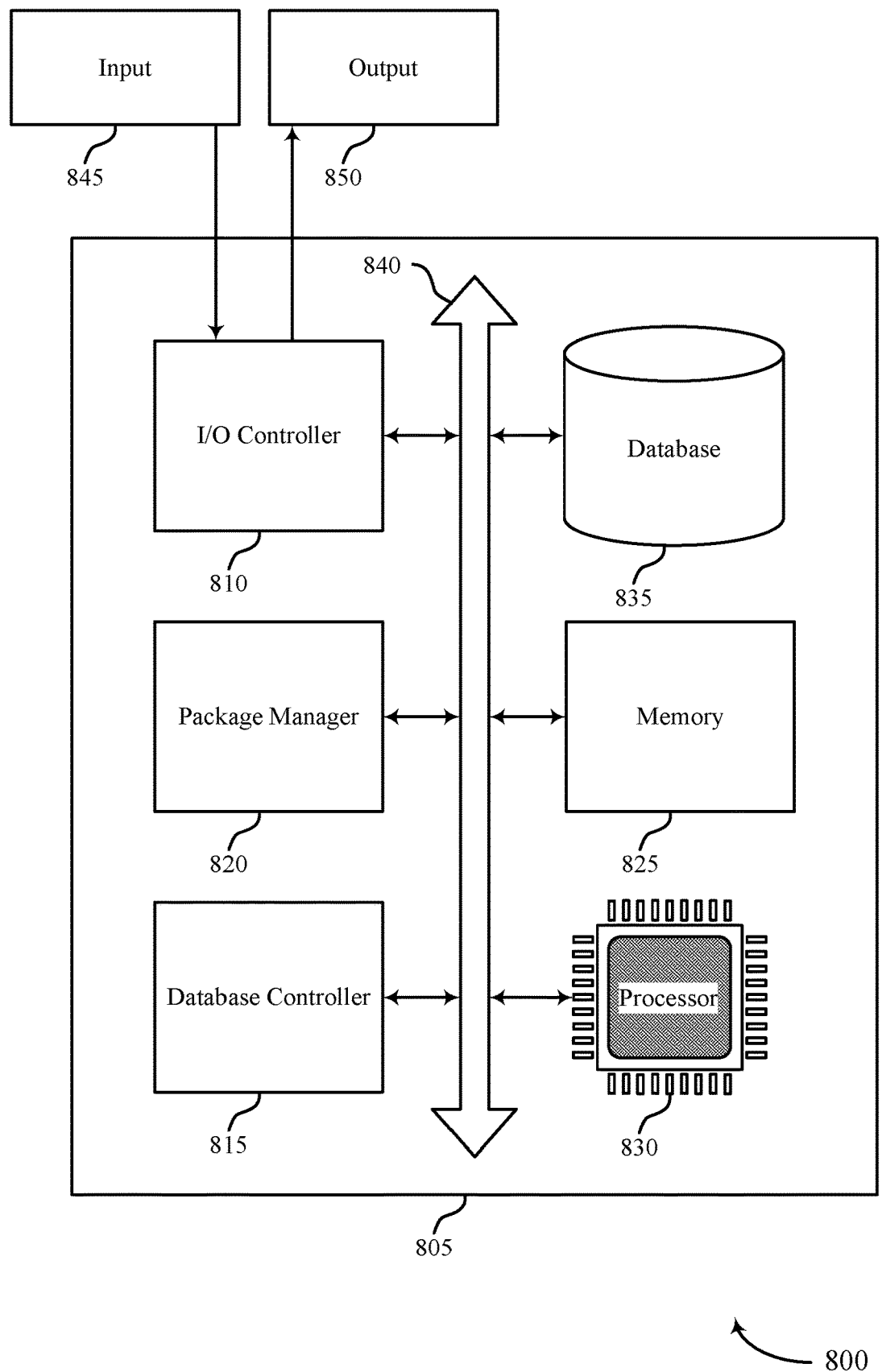
FIG. 8 shows a diagram of a system including a device that supports techniques for data package generation in accordance with aspects of the present disclosure.

FIG. 8 shows a diagram of a system 800 including a device 805 that supports techniques for data package generation in accordance with aspects of the present disclosure. The device 805 may be an example of or include the components of a device 605 as described herein. The device 805 may include components for data communications including components for transmitting and receiving communications, such as a package manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a basic I/O system (BIOS) which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for data package generation).

The package manager 820 may support generating a data package for deployment in a target database environment in accordance with examples as disclosed herein. For example, the package manager 820 may be configured as or otherwise support a means for receiving, from a user at a user interface, a request to generate the data package, the request indicating a first set of data objects from a first configuration associated with a source database environment. The package manager 820 may be configured as or otherwise support a means for determining a second set of data objects from the first configuration that are related to the first set of data objects based on the request and on a mapping between the first set of data objects and the second set of data objects in the source database environment. The package manager 820 may be configured as or otherwise support a means for transmitting an indication of the second set of data objects to the user at the user interface based on the determining. The package manager 820 may be configured as or otherwise support a means for receiving, from the user at the user interface, a selection of one or more data objects from the second set of data objects for inclusion in the data package. The package manager 820 may be configured as or otherwise support a means for generating the data package based on the selection, the data package including a second configuration for deployment in the target database environment, the second configuration including metadata associated with the first set of data objects and metadata associated with the one or more data objects from the selection.

By including or configuring the package manager 820 in accordance with examples as described herein, the device 805 may enable a user device to transfer a deployment configuration from a source database environment to a target database environment with greater efficiency. More specifically, the techniques described herein may enable a user device to select which metadata to include in a data package, which may reduce the overhead associated with data package generation. The described techniques may also reduce the number of errors (e.g., human errors) that occur during deployment migrations between database environments, among other benefits.

Figure 9:
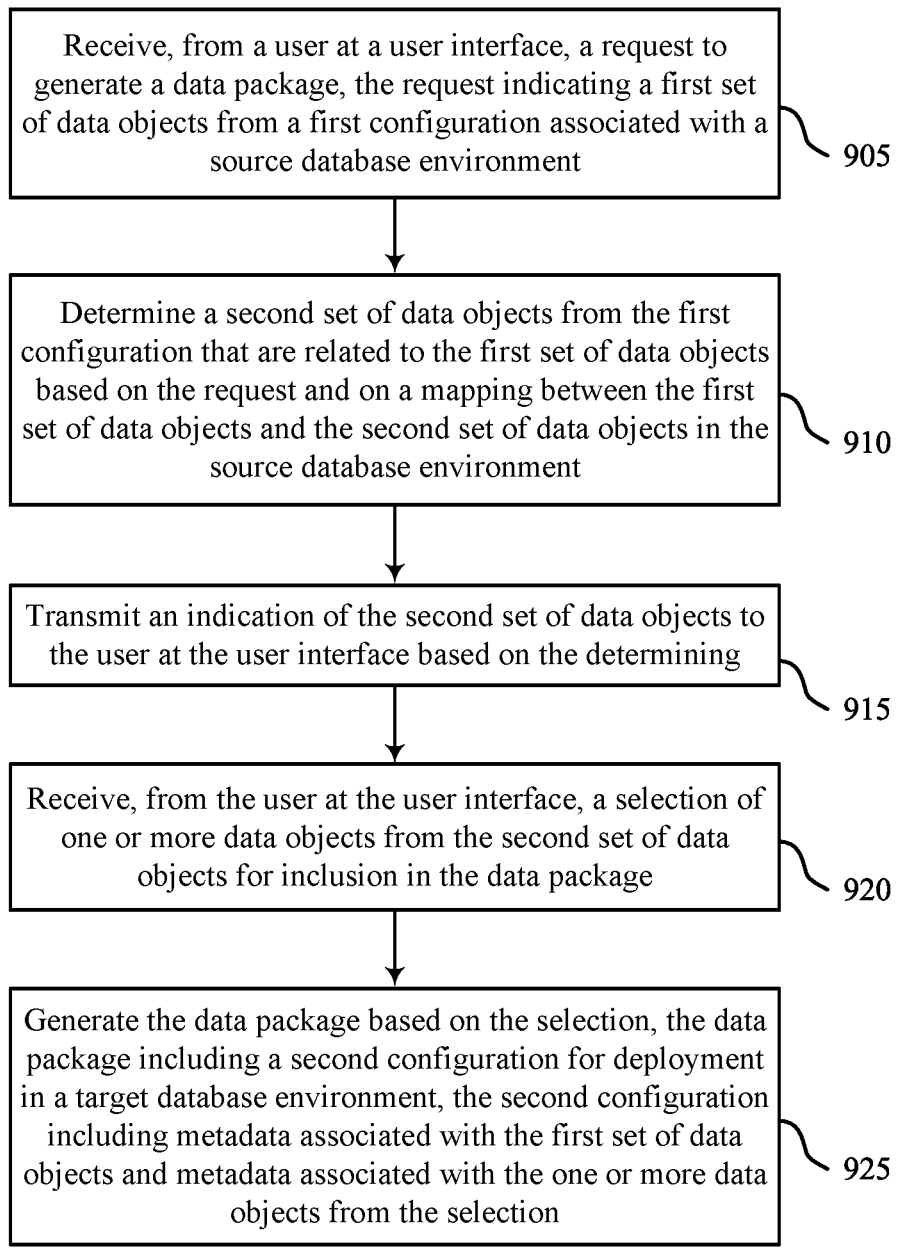
FIGS. 9 through 12 show flowcharts illustrating methods that support techniques for data package generation in accordance with aspects of the present disclosure.

FIG. 9 shows a flowchart illustrating a method 900 that supports techniques for data package generation in accordance with aspects of the present disclosure. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 905, the method may include receiving, from a user at a user interface, a request to generate a data package, the request indicating a first set of data objects from a first configuration associated with a source database environment. The operations of 905 may be performed in accordance with examples as disclosed herein. In some examples, aspects of the operations of 905 may be performed by a request receiving component 725 as described with reference to FIG. 7.

At 910, the method may include determining a second set of data objects from the first configuration that are related to the first set of data objects based on the request and on a mapping between the first set of data objects and the second set of data objects in the source database environment. The operations of 910 may be performed in accordance with examples as disclosed herein. In some examples, aspects of the operations of 910 may be performed by a data object determining component 730 as described with reference to FIG. 7.

At 915, the method may include transmitting an indication of the second set of data objects to the user at the user interface based on the determining. The operations of 915 may be performed in accordance with examples as disclosed herein. In some examples, aspects of the operations of 915 may be performed by an indication transmitting component 735 as described with reference to FIG. 7.

At 920, the method may include receiving, from the user at the user interface, a selection of one or more data objects from the second set of data objects for inclusion in the data package. The operations of 920 may be performed in accordance with examples as disclosed herein. In some examples, aspects of the operations of 920 may be performed by a selection receiving component 740 as described with reference to FIG. 7.

At 925, the method may include generating the data package based on the selection, the data package including a second configuration for deployment in a target database environment, the second configuration including metadata associated with the first set of data objects and metadata associated with the one or more data objects from the selection. The operations of 925 may be performed in accordance with examples as disclosed herein. In some examples, aspects of the operations of 925 may be performed by a data package generating component 745 as described with reference to FIG. 7.

Figure 10:
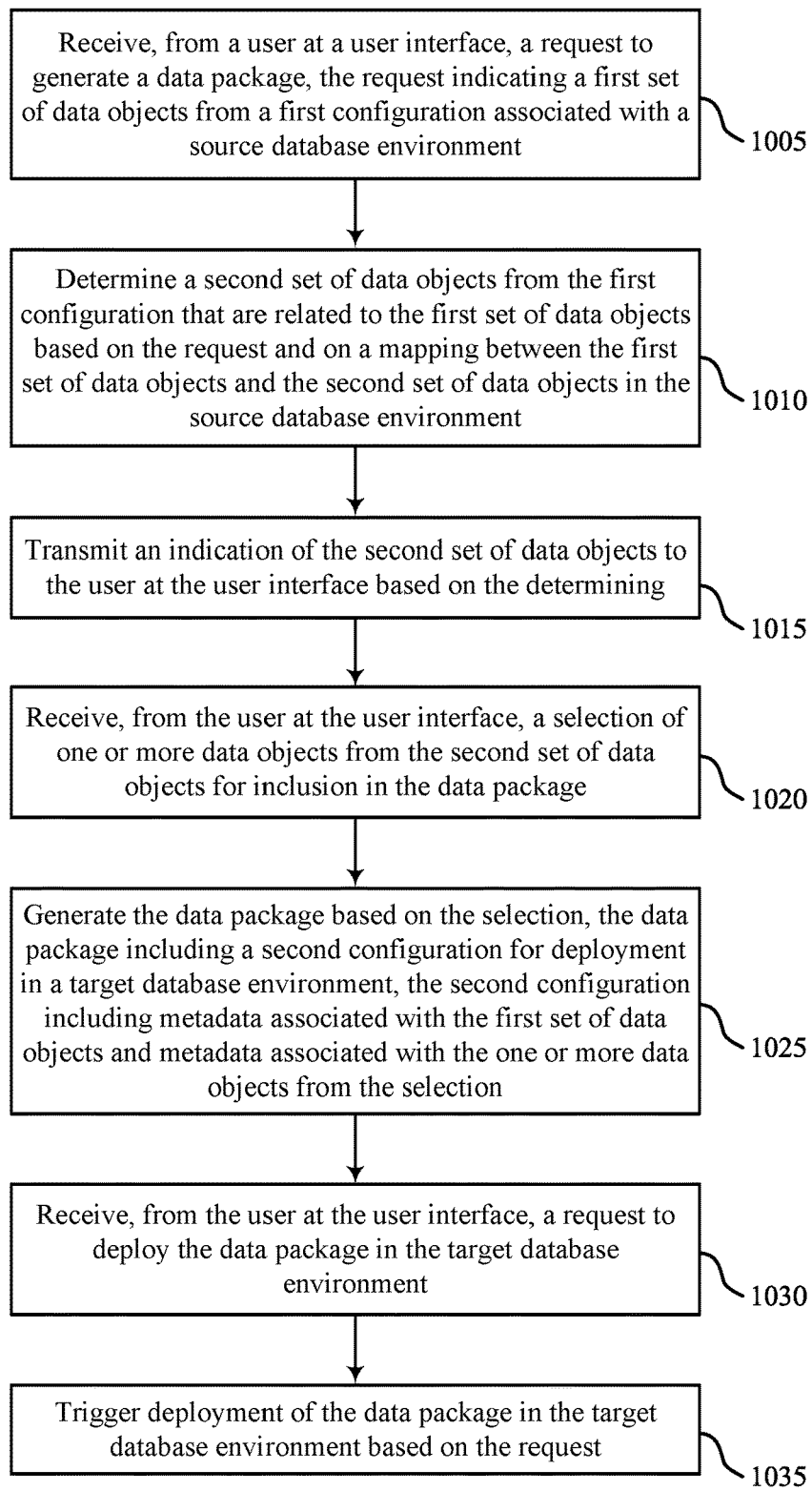

FIG. 10 shows a flowchart illustrating a method 1000 that supports techniques for data package generation in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1005, the method may include receiving, from a user at a user interface, a request to generate a data package, the request indicating a first set of data objects from a first configuration associated with a source database environment. The operations of 1005 may be performed in accordance with examples as disclosed herein. In some examples, aspects of the operations of 1005 may be performed by a request receiving component 725 as described with reference to FIG. 7.

At 1010, the method may include determining a second set of data objects from the first configuration that are related to the first set of data objects based on the request and on a mapping between the first set of data objects and the second set of data objects in the source database environment. The operations of 1010 may be performed in accordance with examples as disclosed herein. In some examples, aspects of the operations of 1010 may be performed by a data object determining component 730 as described with reference to FIG. 7.

At 1015, the method may include transmitting an indication of the second set of data objects to the user at the user interface based on the determining. The operations of 1015 may be performed in accordance with examples as disclosed herein. In some examples, aspects of the operations of 1015 may be performed by an indication transmitting component 735 as described with reference to FIG. 7.

At 1020, the method may include receiving, from the user at the user interface, a selection of one or more data objects from the second set of data objects for inclusion in the data package. The operations of 1020 may be performed in accordance with examples as disclosed herein. In some examples, aspects of the operations of 1020 may be performed by a selection receiving component 740 as described with reference to FIG. 7.

At 1025, the method may include generating the data package based on the selection, the data package including a second configuration for deployment in a target database environment, the second configuration including metadata associated with the first set of data objects and metadata associated with the one or more data objects from the selection. The operations of 1025 may be performed in accordance with examples as disclosed herein. In some examples, aspects of the operations of 1025 may be performed by a data package generating component 745 as described with reference to FIG. 7.

At 1030, the method may include receiving, from the user at the user interface, a request to deploy the data package in the target database environment. The operations of 1030 may be performed in accordance with examples as disclosed herein. In some examples, aspects of the operations of 1030 may be performed by a request receiving component 725 as described with reference to FIG. 7.

At 1035, the method may include triggering deployment of the data package in the target database environment based on the request. The operations of 1035 may be performed in accordance with examples as disclosed herein. In some examples, aspects of the operations of 1035 may be performed by a deployment triggering component 750 as described with reference to FIG. 7.

Figure 11:
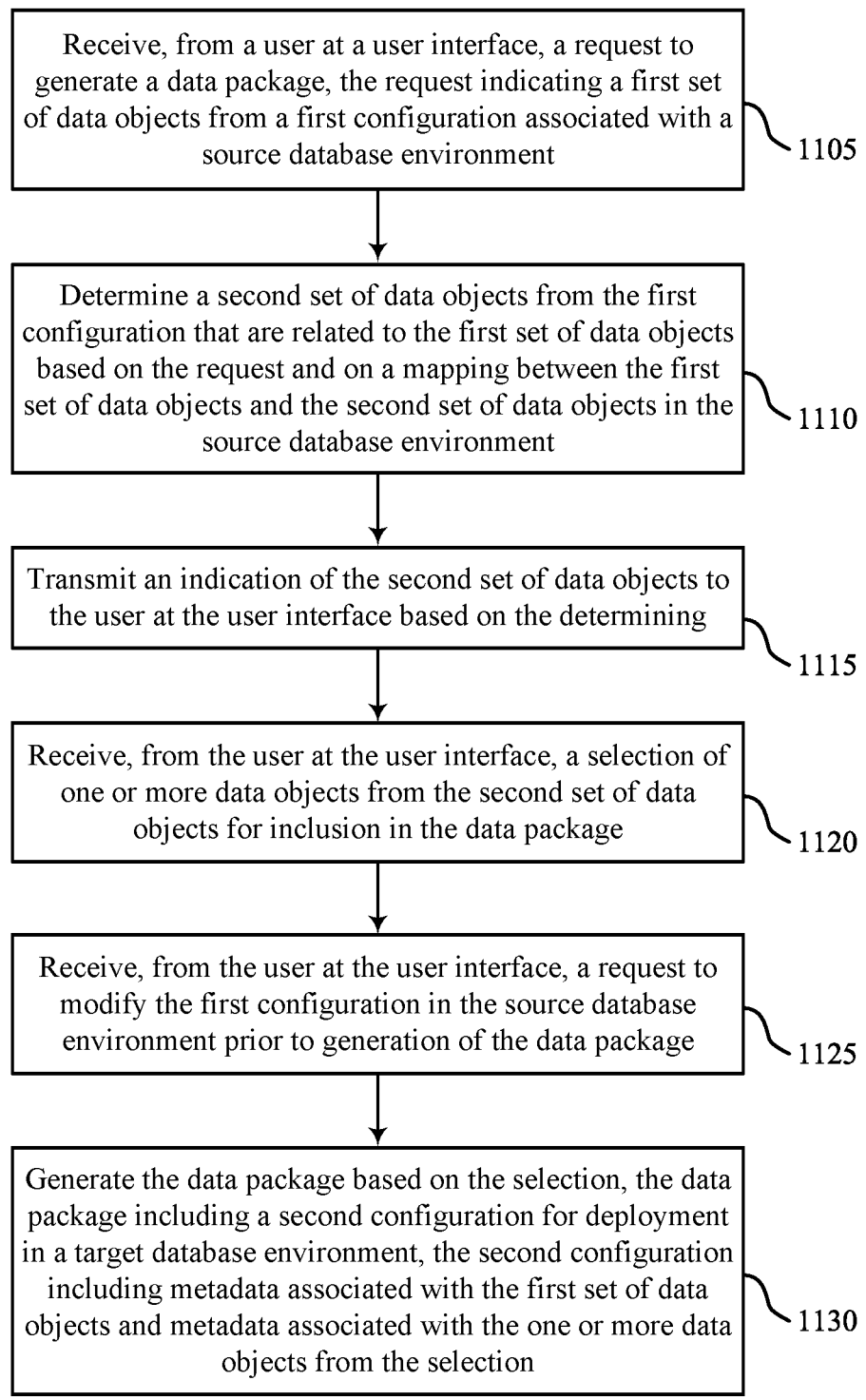

FIG. 11 shows a flowchart illustrating a method 1100 that supports techniques for data package generation in accordance with aspects of the present disclosure. The operations of the method 1100 may be implemented by an application server or its components as described herein. For example, the operations of the method 1100 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1105, the method may include receiving, from a user at a user interface, a request to generate a data package, the request indicating a first set of data objects from a first configuration associated with a source database environment. The operations of 1105 may be performed in accordance with examples as disclosed herein. In some examples, aspects of the operations of 1105 may be performed by a request receiving component 725 as described with reference to FIG. 7.

At 1110, the method may include determining a second set of data objects from the first configuration that are related to the first set of data objects based on the request and on a mapping between the first set of data objects and the second set of data objects in the source database environment. The operations of 1110 may be performed in accordance with examples as disclosed herein. In some examples, aspects of the operations of 1110 may be performed by a data object determining component 730 as described with reference to FIG. 7.

At 1115, the method may include transmitting an indication of the second set of data objects to the user at the user interface based on the determining. The operations of 1115 may be performed in accordance with examples as disclosed herein. In some examples, aspects of the operations of 1115 may be performed by an indication transmitting component 735 as described with reference to FIG. 7.

At 1120, the method may include receiving, from the user at the user interface, a selection of one or more data objects from the second set of data objects for inclusion in the data package. The operations of 1120 may be performed in accordance with examples as disclosed herein. In some examples, aspects of the operations of 1120 may be performed by a selection receiving component 740 as described with reference to FIG. 7.

At 1125, the method may include receiving, from the user at the user interface, a request to modify the first configuration in the source database environment prior to generation of the data package. The operations of 1125 may be performed in accordance with examples as disclosed herein. In some examples, aspects of the operations of 1125 may be performed by a request receiving component 725 as described with reference to FIG. 7.

At 1130, the method may include generating the data package based on the selection, the data package including a second configuration for deployment in a target database environment, the second configuration including metadata associated with the first set of data objects and metadata associated with the one or more data objects from the selection. The operations of 1130 may be performed in accordance with examples as disclosed herein. In some examples, aspects of the operations of 1130 may be performed by a data package generating component 745 as described with reference to FIG. 7.

Figure 12:
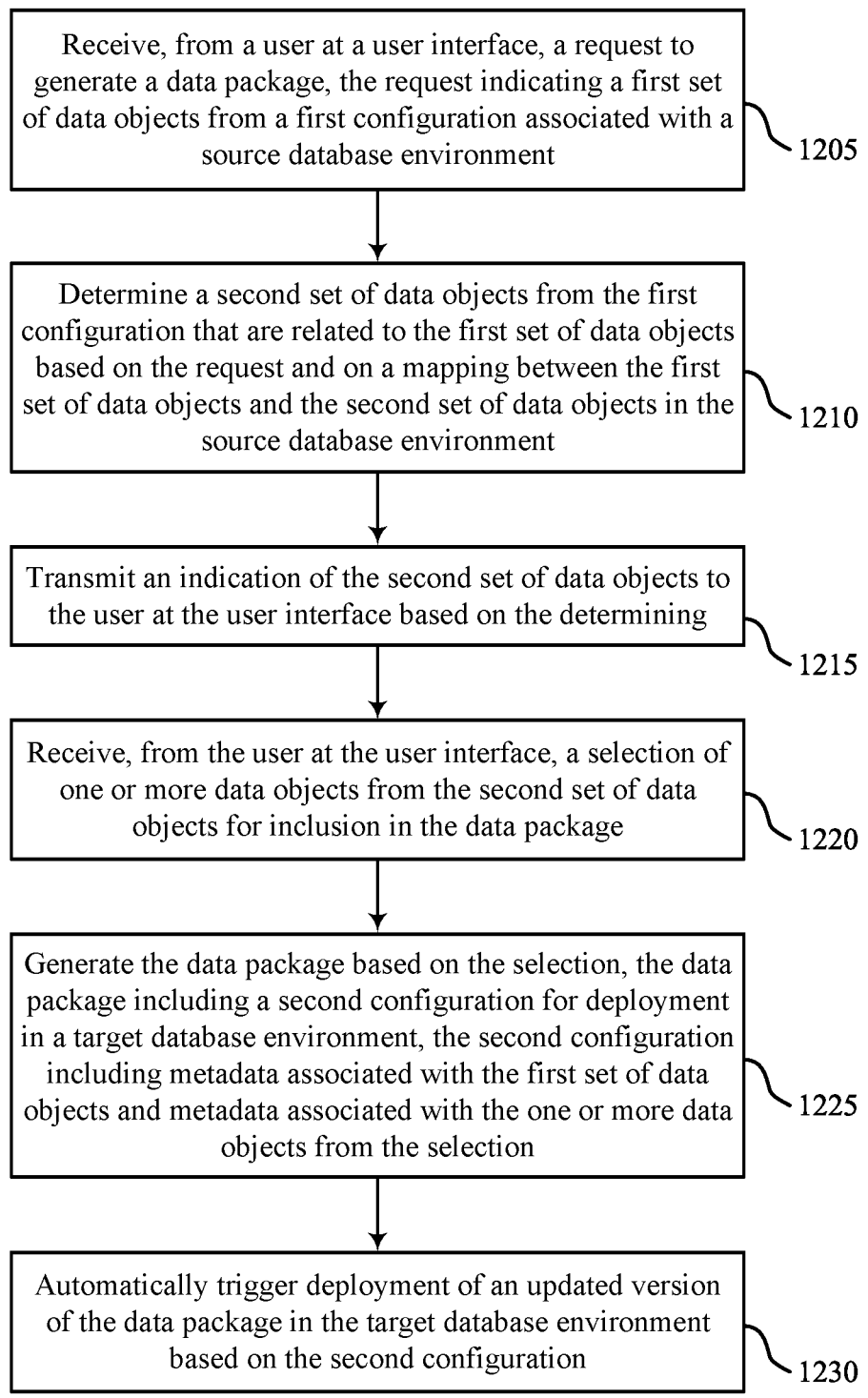

FIG. 12 shows a flowchart illustrating a method 1200 that supports techniques for data package generation in accordance with aspects of the present disclosure. The operations of the method 1200 may be implemented by an application server or its components as described herein. For example, the operations of the method 1200 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1205, the method may include receiving, from a user at a user interface, a request to generate the data package, the request indicating a first set of data objects from a first configuration associated with a source database environment. The operations of 1205 may be performed in accordance with examples as disclosed herein. In some examples, aspects of the operations of 1205 may be performed by a request receiving component 725 as described with reference to FIG. 7.

At 1210, the method may include determining a second set of data objects from the first configuration that are related to the first set of data objects based on the request and on a mapping between the first set of data objects and the second set of data objects in the source database environment. The operations of 1210 may be performed in accordance with examples as disclosed herein. In some examples, aspects of the operations of 1210 may be performed by a data object determining component 730 as described with reference to FIG. 7.

At 1215, the method may include transmitting an indication of the second set of data objects to the user at the user interface based on the determining. The operations of 1215 may be performed in accordance with examples as disclosed herein. In some examples, aspects of the operations of 1215 may be performed by an indication transmitting component 735 as described with reference to FIG. 7.

At 1220, the method may include receiving, from the user at the user interface, a selection of one or more data objects from the second set of data objects for inclusion in the data package. The operations of 1220 may be performed in accordance with examples as disclosed herein. In some examples, aspects of the operations of 1220 may be performed by a selection receiving component 740 as described with reference to FIG. 7.

At 1225, the method may include generating the data package based on the selection, the data package including a second configuration for deployment in a target database environment, the second configuration including metadata associated with the first set of data objects and metadata associated with the one or more data objects from the selection. The operations of 1225 may be performed in accordance with examples as disclosed herein. In some examples, aspects of the operations of 1225 may be performed by a data package generating component 745 as described with reference to FIG. 7.

At 1230, the method may include automatically triggering deployment of an updated version of the data package in the target database environment based on the second configuration. The operations of 1230 may be performed in accordance with examples as disclosed herein. In some examples, aspects of the operations of 1230 may be performed by a deployment triggering component 750 as described with reference to FIG. 7.

A method for generating a data package for deployment in a target database environment is described. The method may include receiving, from a user at a user interface, a request to generate the data package, the request indicating a first set of data objects from a first configuration associated with a source database environment; determining a second set of data objects from the first configuration that are related to the first set of data objects based on the request and on a mapping between the first set of data objects and the second set of data objects in the source database environment; transmitting an indication of the second set of data objects to the user at the user interface based on the determining; receiving, from the user at the user interface, a selection of one or more data objects from the second set of data objects for inclusion in the data package; and generating the data package based on the selection, the data package including a second configuration for deployment in the target database environment, the second configuration including metadata associated with the first set of data objects and metadata associated with the one or more data objects from the selection.

An apparatus for generating a data package for deployment in a target database environment is described. The apparatus may include a processor, memory coupled with the processor, and instructions stored in the memory. The instructions may be executable by the processor to cause the apparatus to receive, from a user at a user interface, a request to generate the data package, the request indicating a first set of data objects from a first configuration associated with a source database environment; determine a second set of data objects from the first configuration that are related to the first set of data objects based on the request and on a mapping between the first set of data objects and the second set of data objects in the source database environment; transmit an indication of the second set of data objects to the user at the user interface based on the determining; receive, from the user at the user interface, a selection of one or more data objects from the second set of data objects for inclusion in the data package; and generate the data package based on the selection, the data package including a second configuration for deployment in the target database environment, the second configuration including metadata associated with the first set of data objects and metadata associated with the one or more data objects from the selection.

Another apparatus for generating a data package for deployment in a target database environment is described. The apparatus may include means for receiving, from a user at a user interface, a request to generate the data package, the request indicating a first set of data objects from a first configuration associated with a source database environment; means for determining a second set of data objects from the first configuration that are related to the first set of data objects based on the request and on a mapping between the first set of data objects and the second set of data objects in the source database environment; means for transmitting an indication of the second set of data objects to the user at the user interface based on the determining; means for receiving, from the user at the user interface, a selection of one or more data objects from the second set of data objects for inclusion in the data package; and means for generating the data package based on the selection, the data package including a second configuration for deployment in the target database environment, the second configuration including metadata associated with the first set of data objects and metadata associated with the one or more data objects from the selection.

A non-transitory computer-readable medium storing code for generating a data package for deployment in a target database environment is described. The code may include instructions executable by a processor to receive, from a user at a user interface, a request to generate the data package, the request indicating a first set of data objects from a first configuration associated with a source database environment; determine a second set of data objects from the first configuration that are related to the first set of data objects based on the request and on a mapping between the first set of data objects and the second set of data objects in the source database environment; transmit an indication of the second set of data objects to the user at the user interface based on the determining; receive, from the user at the user interface, a selection of one or more data objects from the second set of data objects for inclusion in the data package; and generate the data package based on the selection, the data package including a second configuration for deployment in the target database environment, the second configuration including metadata associated with the first set of data objects and metadata associated with the one or more data objects from the selection.

Some examples of the method, apparatuses, and non-transitory computer-readable medium described herein may further include operations, features, means, or instructions for receiving, from the user at the user interface, a request to deploy the data package in the target database environment; and triggering deployment of the data package in the target database environment based on the request.

Some examples of the method, apparatuses, and non-transitory computer-readable medium described herein may further include operations, features, means, or instructions for generating the first set of data objects and the one or more data objects from the selection in the target database environment based on triggering deployment of the data package.

Some examples of the method, apparatuses, and non-transitory computer-readable medium described herein may further include operations, features, means, or instructions for generating the mapping between one or more data fields associated with the first set of data objects and one or more data fields associated with the second set of data objects.

In some examples of the method, apparatuses, and non-transitory computer-readable medium described herein, the user may be associated with a tenant of a multi-tenant system; the source database environment may correspond to a test database environment of the tenant; and the target database environment may correspond to a production database environment of the tenant.

Some examples of the method, apparatuses, and non-transitory computer-readable medium described herein may further include operations, features, means, or instructions for receiving, from the user at the user interface, a request to modify the first configuration in the source database environment prior to generation of the data package.

In some examples of the method, apparatuses, and non-transitory computer-readable medium described herein, the second configuration includes metadata associated with one or more data streams, metadata associated with one or more data models related to the one or more data streams, activation metadata associated with the target database environment, or a combination thereof.

In some examples of the method, apparatuses, and non-transitory computer-readable medium described herein, the first set of data objects includes one or more data streams; and the second set of data objects includes one or more data lakes associated with the one or more data streams, one or more data models associated with the one or more data streams, one or more data actions associated with the one or more data streams, or a combination thereof.

In some examples of the method, apparatuses, and non-transitory computer-readable medium described herein, the second configuration includes a set of rules for performing a segmentation procedure on multiple data records stored in the target database environment, a set of rules for performing a match and merge procedure on the multiple data records stored in the target database environment, or both.

In some examples of the method, apparatuses, and non-transitory computer-readable medium described herein, receiving the selection from the user may include operations, features, means, or instructions for receiving, from the user at the user interface, a selection of a calculated insight definition for inclusion in the data package, the calculated insight definition including a name field, an activation status field, a last run time field, a last run status field, a user identifier associated with the calculated insight definition, a creation date field, a last modified date field, or a combination thereof.

Some examples of the method, apparatuses, and non-transitory computer-readable medium described herein may further include operations, features, means, or instructions for generating multiple calculated insight metrics for display in the target database environment based on the calculated insight definition and on multiple data records stored in the target database environment.

In some examples of the method, apparatuses, and non-transitory computer-readable medium described herein, receiving the selection from the user may include operations, features, means, or instructions for receiving, from the user at the user interface, a selection of a data stream definition for inclusion in the data package, the data stream definition including a name field, a connector type field, an activation status field, a last run status field, a last process records field, a total records field, a last refreshed field, or a combination thereof.

Some examples of the method, apparatuses, and non-transitory computer-readable medium described herein may further include operations, features, means, or instructions for generating a data stream in the target database environment based on the data stream definition and on multiple data records stored in the target database environment.

In some examples of the method, apparatuses, and non-transitory computer-readable medium described herein, receiving the selection from the user may include operations, features, means, or instructions for receiving, from the user at the user interface, a selection of one or more match and merge rules for inclusion in the data package, the one or more match and merge rules defining criteria for combining multiple data records stored in the target database environment.

Some examples of the method, apparatuses, and non-transitory computer-readable medium described herein may further include operations, features, means, or instructions for updating the second configuration in the target database environment; and transmitting, to the user at the user interface, an indication that an updated version of the data package is available for deployment in the target database environment.

Some examples of the method, apparatuses, and non-transitory computer-readable medium described herein may further include operations, features, means, or instructions for receiving, from the user at the user interface, a request to deploy the updated version of the data package; and triggering deployment of the updated version of the data package in the target database environment based on the request.

Some examples of the method, apparatuses, and non-transitory computer-readable medium described herein may further include operations, features, means, or instructions for automatically triggering deployment of an updated version of the data package in the target database environment based on the second configuration.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating a data package for deployment in a target database environment, comprising:
   receiving, from a user via a user interface, a request to generate the data package, the request indicating a first set of data objects from a first configuration associated with a source database environment different from the target database environment;
   determining that a second set of data objects from the first configuration are related to the first set of data objects based at least in part on the request and a mapping between the first set of data objects and the second set of data objects in the source database environment;
   transmitting an indication of the second set of data objects that are related to the first set of data objects;
   receiving, from the user via the user interface, a selection of a subset of the second set of data objects for inclusion in the data package; and
   generating the data package in association with migrating the first configuration from the source database environment to the target database environment, the data package comprising the subset of the second set of data objects from the source database environment.

2. The method of claim 1, further comprising:
   receiving, from the user at the user interface, a request to deploy the data package in the target database environment; and
   triggering deployment of the data package in the target database environment based at least in part on the request.

3. The method of claim 2, further comprising:
   generating the first set of data objects and the subset of the second set of data objects from the selection in the target database environment based at least in part on triggering deployment of the data package.

4. The method of claim 1, further comprising:
   generating the mapping between one or more data fields associated with the first set of data objects and one or more data fields associated with the second set of data objects.

5. The method of claim 1, wherein:
   the user is associated with a tenant of a multi-tenant system;
   the source database environment corresponds to a test database environment of the tenant; and
   the target database environment corresponds to a production database environment of the tenant.

6. The method of claim 1, further comprising:
   receiving, from the user at the user interface, a request to modify the first configuration in the source database environment prior to generation of the data package.

7. The method of claim 1, wherein the data package comprises metadata associated with one or more data streams, metadata associated with one or more data models related to the one or more data streams, activation metadata associated with the target database environment, or a combination thereof.

8. The method of claim 1, wherein:
   the first set of data objects comprises one or more data streams; and
   the second set of data objects comprises one or more data lakes associated with the one or more data streams, one or more data models associated with the one or more data streams, one or more data actions associated with the one or more data streams, or a combination thereof.

9. The method of claim 1, wherein the data package comprises a set of rules for performing a segmentation procedure on a plurality of data records stored in the target database environment, a set of rules for performing a match and merge procedure on the plurality of data records stored in the target database environment, or both.

10. The method of claim 1, wherein receiving the selection from the user comprises:
    receiving, from the user at the user interface, a selection of a calculated insight definition for inclusion in the data package, the calculated insight definition comprising a name field, an activation status field, a last run time field, a last run status field, a user identifier associated with the calculated insight definition, a creation date field, a last modified date field, or a combination thereof.

11. The method of claim 10, further comprising:
    generating a plurality of calculated insight metrics for display in the target database environment based at least in part on the calculated insight definition and on a plurality of data records stored in the target database environment.

12. The method of claim 1, wherein receiving the selection from the user comprises:
    receiving, from the user at the user interface, a selection of a data stream definition for inclusion in the data package, the data stream definition comprising a name field, a connector type field, an activation status field, a last run status field, a last process records field, a total records field, a last refreshed field, or a combination thereof.

13. The method of claim 12, further comprising:
generating a data stream in the target database environment based at least in part on the data stream definition and on a plurality of data records stored in the target database environment.

14. The method of claim 1, wherein receiving the selection from the user comprises:
receiving, from the user at the user interface, a selection of one or more match and merge rules for inclusion in the data package, the one or more match and merge rules defining criteria for combining a plurality of data records stored in the target database environment.

15. The method of claim 1, further comprising:
updating the data package in the target database environment; and
transmitting, to the user at the user interface, an indication that an updated version of the data package is available for deployment in the target database environment.

16. The method of claim 15, further comprising:
receiving, from the user at the user interface, a request to deploy the updated version of the data package; and
triggering deployment of the updated version of the data package in the target database environment based at least in part on the request.

17. The method of claim 1, further comprising:
automatically triggering deployment of an updated version of the data package in the target database environment based at least in part on a second configuration.

18. An apparatus for generating a data package for deployment in a target database environment, comprising:
a processor;
memory coupled with the processor; and
instructions stored in the memory and executable by the processor to cause the apparatus to:
receive, from a user via a user interface, a request to generate the data package, the request indicating a first set of data objects from a first configuration associated with a source database environment different from the target database environment;
determine that a second set of data objects from the first configuration are related to the first set of data objects based at least in part on the request and a mapping between the first set of data objects and the second set of data objects in the source database environment;
transmit an indication of the second set of data objects that are related to the first set of data objects;
receive, from the user via the user interface, a selection of a subset of the second set of data objects for inclusion in the data package; and
generate the data package in association with migrating the first configuration from the source database environment to the target database environment, the data package comprising metadata associated with the first set of data objects and the subset of the second set of data objects from the source database environment.

19. The apparatus of claim 18, wherein the instructions are further executable by the processor to cause the apparatus to:
receive, from the user at the user interface, a request to deploy the data package in the target database environment; and
trigger deployment of the data package in the target database environment based at least in part on the request.

20. A non-transitory computer-readable medium storing code for generating a data package for deployment in a target database environment, the code comprising instructions executable by a processor to:
receive, from a user via a user interface, a request to generate the data package, the request indicating a first set of data objects from a first configuration associated with a source database environment different from the target database environment;
determine that a second set of data objects from the first configuration are related to the first set of data objects based at least in part on the request and a mapping between the first set of data objects and the second set of data objects in the source database environment;
transmit an indication of the second set of data objects that are related to the first set of data objects;
receive, from the user via the user interface, a selection of a subset of the second set of data objects for inclusion in the data package; and
generate the data package in association with migrating the first configuration from the source database environment to the target database environment, the data package comprising metadata associated with the first set of data objects and the subset of the second set of data objects from the source database environment.

* * * * *